United States Patent
Goyal et al.

(10) Patent No.: US 11,755,950 B2
(45) Date of Patent: Sep. 12, 2023

(54) METHODS FOR REFINING DATA SET TO REPRESENT OUTPUT OF AN ARTIFICIAL INTELLIGENCE MODEL

(71) Applicant: International Business Machines Corporation, Armonk, NY (US)

(72) Inventors: Prem Piyush Goyal, Hyderabad (IN); Manish Anand Bhide, Hyderabad (IN); Harivansh Kumar, Hyderabad (IN); Venkata R. Madugundu, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 414 days.

(21) Appl. No.: 16/916,793

(22) Filed: Jun. 30, 2020

(65) Prior Publication Data

US 2021/0406762 A1 Dec. 30, 2021

(51) Int. Cl.
| | |
|---|---|
| *G06N 20/00* | (2019.01) |
| *G06F 18/214* | (2023.01) |
| *G06F 18/2451* | (2023.01) |
| *G06Q 10/067* | (2023.01) |
| *G06F 18/24* | (2023.01) |
| *G06Q 40/12* | (2023.01) |

(52) U.S. Cl.
CPC ......... *G06N 20/00* (2019.01); *G06F 18/214* (2023.01); *G06F 18/24* (2023.01); *G06F 18/2451* (2023.01); *G06Q 10/067* (2013.01); *G06Q 40/12* (2013.12)

(58) Field of Classification Search
CPC .......... G06F 11/30; G06F 40/40; G06F 18/24; G06F 21/602; G06F 21/6254; G06N 20/00; G06N 7/005; G06N 20/20; G06N 5/045; G06N 7/01; G06N 3/08; G06Q 10/0635; G06Q 10/067; G06Q 40/12; G06Q 20/3678; G06Q 20/102; G06Q 20/02; G06Q 40/04; G06Q 20/065; G06Q 40/06; H04L 9/50; H04L 9/32; H04L 9/3239

See application file for complete search history.

(56) References Cited

U.S. PATENT DOCUMENTS

2017/0364831 A1* 12/2017 Ghosh ................. G06N 20/00
2019/0122135 A1   4/2019 Parker
(Continued)

OTHER PUBLICATIONS

Thai Le and Suhang Wang and Dongwon Lee, Generating Concise and Informative Contrastive Sample to Explain Neural Network Model's Prediction, ArXiv, Nov. 2019.

(Continued)

*Primary Examiner* — Kyung H Shin
(74) *Attorney, Agent, or Firm* — Troutman Pepper Hamilton Sanders LLP

(57) ABSTRACT

A computer-implemented method for refining dataset to accurately represent output of an artificial intelligence model includes generating a plurality of data points used to interpret a decision of an artificial intelligence model. A subset of data points from the generated plurality of data points satisfying one or more constraints is identified. A linear model is applied on the identified subset of data points satisfying the one or more constraints. One or more insights illustrating the decision of the artificial intelligence model is generated.

18 Claims, 6 Drawing Sheets

(56) References Cited

U.S. PATENT DOCUMENTS

2019/0370496 A1* 12/2019 Chen .................... G06Q 10/067
2020/0250556 A1*  8/2020 Nourian .................. G06F 18/24
2021/0264520 A1*  8/2021 Cummings ............ G06Q 40/12

OTHER PUBLICATIONS

Yunzhe Jia, James Bailey, Kotagiri Ramamohanarao, Christopher Leckie, and Michael E. Houle. 2019. Improving the Quality of Explanations with Local Embedding Perturbations. In Proceedings of the 25th ACM SIGKDD International Conference on Knowledge Discovery & Data Mining (KDD '19). Association for Computing Machinery, New York, NY, USA, 875-884. DOI:https://doi.org/10.1145/3292500.3330930.

Jie M. Zhang, Mark Harman, Benjamin Guedj, Earl T. Barr, John Shawe-Taylor, "Perturbation Validation: A New Heuristic to Validate Machine Learning Models," Ground AI, May 24, 2019.

R. C. Fong and A. Vedaldi, "Interpretable Explanations of Black Boxes by Meaningful Perturbation," 2017 IEEE International Conference on Computer Vision (ICCV), Venice, 2017, pp. 3449-3457, doi: 10.1109/ICCV.2017.371.

Le, et al., Why X rather than Y? Explaining Neural Model Predictions by Generating Intervention Counterfactual Samples, The Pennsylvania State University, Conference'17, Jul. 2017, Washington, DC, USA, arXiv:1911.02042v1 [cs.LG] Nov. 5, 2019.

* cited by examiner

```
"content" : {
  "source_column" : "education"
  "target_column" : "occupation" ,
  "rare_combinations" : [
   {
      "source_value" : "10th grade" ,
      "target_values" : [
          "Professor"
      ]
   } ,
   {
      "source_value" : "5th grade-6th grade" ,
      "target_values" : [
          "Executive (Managerial)" ,
          "Professor"
      ]
   } ,
   }
      "source_value" : "9th grade" ,
      "target_values" : [
          "Professor"
      ]
   } ,
   }
      "source_value" : "Doctorate" ,
      "target_values" : [
          "Craft-repair" ,
          "Other-service"
      ]
   } ,
   }
      "source_value" : "Masters"
      "target_values" : [
          "Handlers-cleaners" ,
          "Machine-op-inspct"
      ]
   } ,
   }
      "source_value" : "Prof-school" ,
      "target_values" : [
          "Machine-op-inspct",
          "Other-service"
      ]
  ]
```

FIG. 4

| age | gender | education | occupation |
|---|---|---|---|
| 39 | Male | Bachelors | Adm-clerical |
| 50 | Male | 5th grade – 6th grade | Executive (Managerial) |
| 38 | Male | HS-grad | Handlers-cleaners |
| 53 | Male | 10th grade | Professor |
| 28 | Female | 5th grade – 6th grade | Professor |
| 37 | Female | Masters | Executive (Managerial) |
| 49 | Female | 9th | Other-service |
| 52 | Male | HS-grad | Executive (Managerial) |
| 31 | Female | Masters | Handlers-cleaners |
| 42 | Male | Bachelors | Executive (Managerial) |

FIG. 5

METHODS FOR REFINING DATA SET TO REPRESENT OUTPUT OF AN ARTIFICIAL INTELLIGENCE MODEL

TECHNICAL FIELD

The present application generally relates to managing data in artificial intelligence, and more particularly, to refining dataset to accurately represent output of an artificial intelligence model and devices thereof.

BACKGROUND

Existing technologies use data set to generate one or more conclusions or classifications. For example, a data set may be used to determine a binary decision of whether a mortgage can be approved or rejected for an applicant. Many of these existing technologies may employ machine learning to make the binary decision. However, to interpret the binary decisions of the machine learning models, accurate training data that was used to train the machine learning model is required. Unfortunately, the existing technologies while interpreting the decision make use of the perturbed data which is randomly generated. This perturbed data results in inaccurate analysis or interpretation of the machine learning model. In other words, the existing technologies fail to completely remove the unwanted perturbed data while interpreting the decision of the machine learning model.

Accordingly, there is a requirement for a system to accurately identify and remove the perturbed data while analyzing the decision of a machine learning model.

SUMMARY

Embodiments provide a computer-implemented method for accurately represent output of an artificial intelligence model includes generating a plurality of data points used to interpret a decision of an artificial intelligence model. A subset of data points from the generated plurality of data points that satisfies one or more constraints are identified. A linear model is applied on the identified subset of data points satisfying the one or more constraints. One or more insights illustrating the decision of the artificial intelligence model is generated.

In another embodiment, training data to train the artificial intelligence model is obtained and one or more constraints are generate from the obtained training data to train the artificial intelligence model.

In yet another embodiment, a number of data points in the identified subset of data points exceeds a threshold number.

In another embodiment, another subset of data points from the plurality of data points that do not satisfy the one or more constraints are deleted.

In yet another embodiment, the one or more constraints further comprises, a category constraint, a category-category constraint, and a category-numerical constraint.

In another illustrative embodiment, a non-transitory computer readable medium comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a full question generation processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 4 is an exemplary image illustrating an example of the constraints;

FIG. 5 is an exemplary image illustrating the data points; and

DETAILED DESCRIPTION OF EXEMPLARY EMBODIMENTS

The present invention may be a system, a method, and/or a computer program product for refining dataset to accurately represent output of an artificial intelligence model. The computer program product may include a computer-readable storage medium (or media) having computer-readable program instructions thereon for causing a processor to carry out aspects of the present invention.

Figure 1:
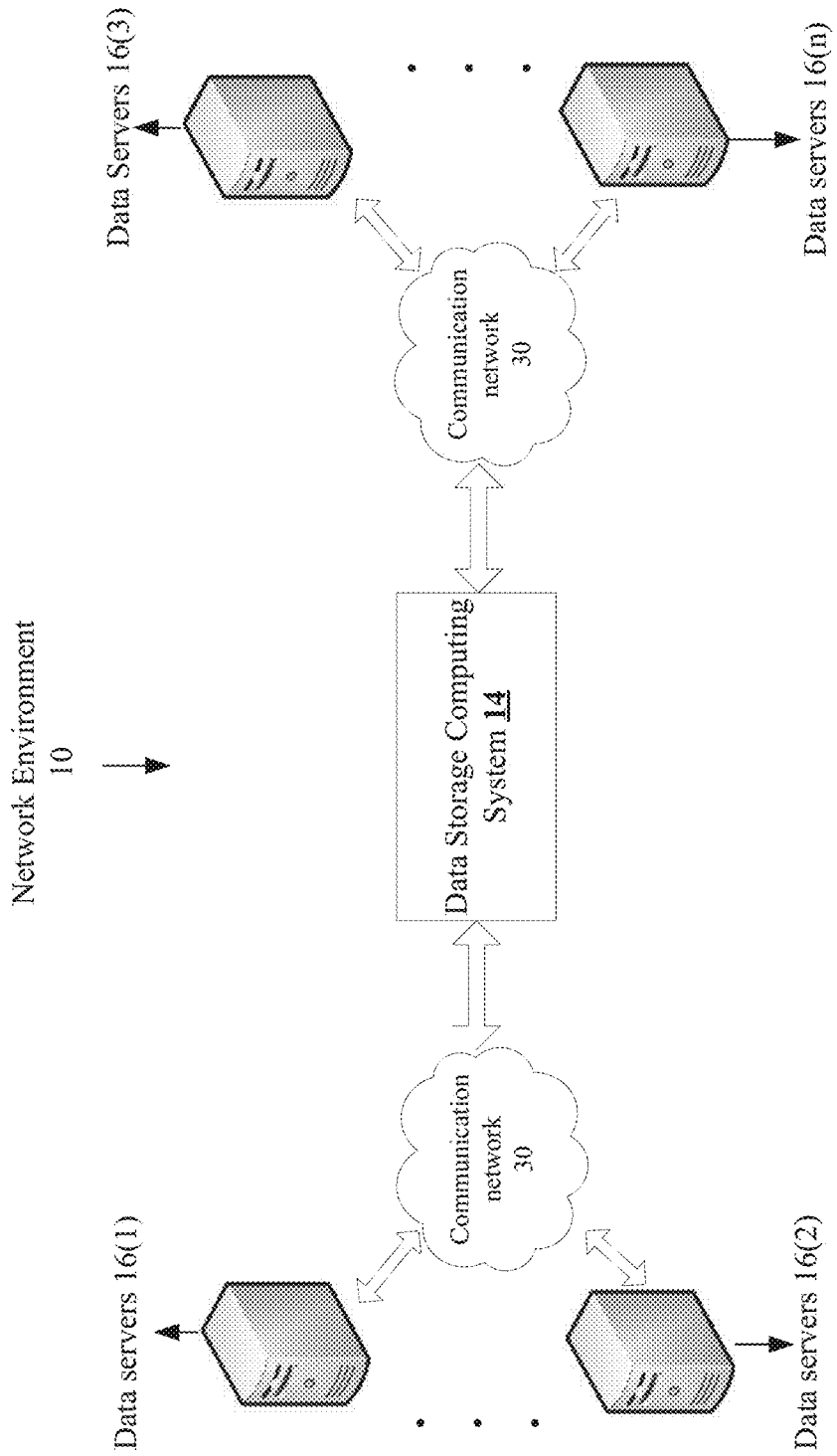
FIG. 1 is an example of a block diagram of a network environment 10 including a data management computing system 14 for refining dataset to accurately represent output of an artificial intelligence model.
Figure 2:
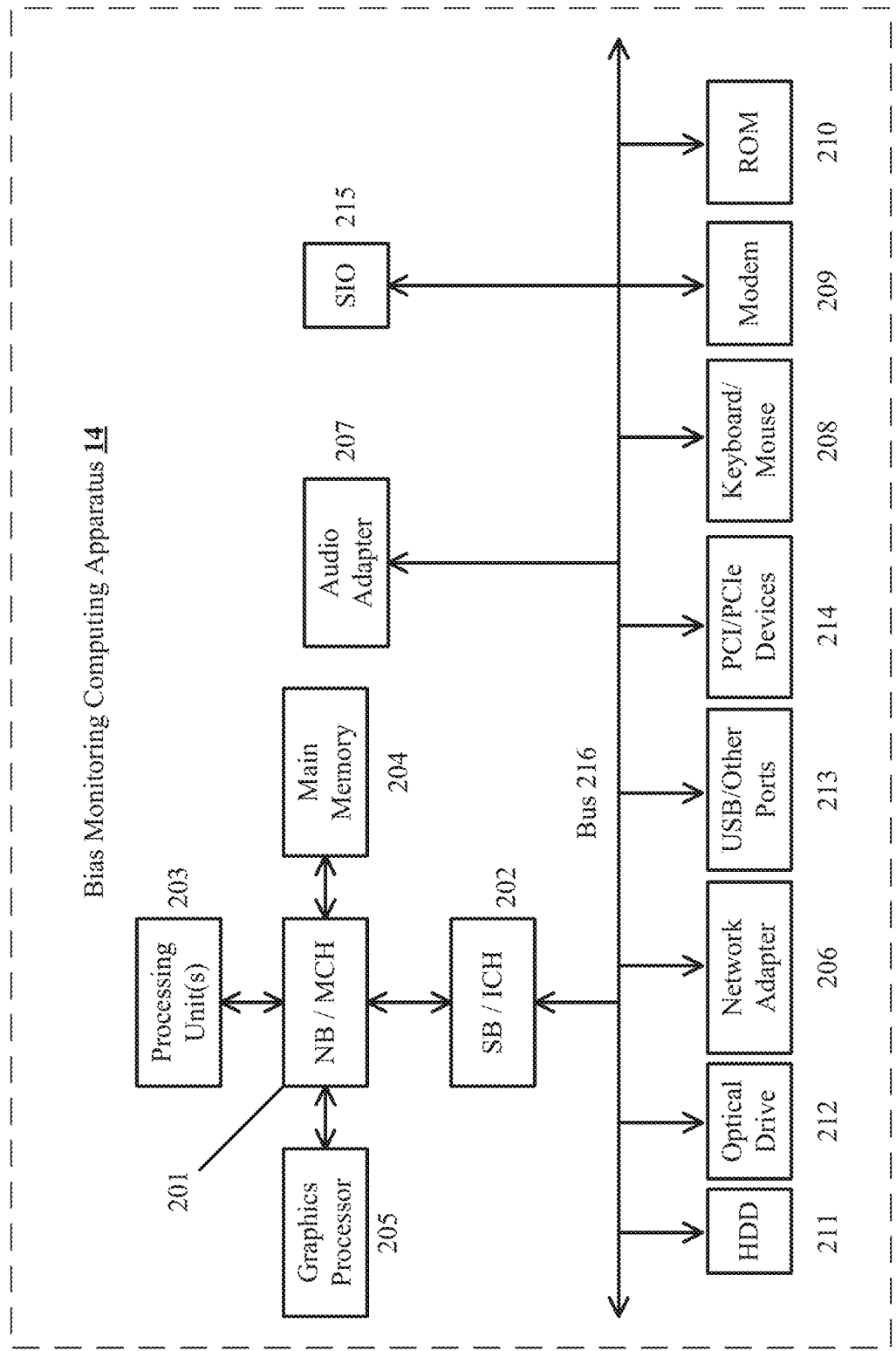
FIG. 2 is an example of a block diagram of a data management computing system 14.

A network environment 10 with an example of a data management computing system 14 is illustrated in FIGS. 1-2. In this particular example, the environment 10 includes the data management computing system 14 and one or more data servers 16(1)-16(n), coupled via one or more communication networks 30, although the environment could include other types and numbers of systems, devices, components, and/or other elements as is generally known in the art and will not be illustrated or described herein. This technology provides a number of advantages including providing methods, non-transitory computer readable medium, and systems that refines dataset to accurately represent output of an artificial intelligence model.

Referring more specifically to FIGS. 1-2, the data management computing system 14 is programmed to refine dataset to accurately represent output of an artificial intelligence model. Now referring to FIG. 2, the data management computing system 14 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH 201 through an accelerated graphics port (AGP).

In the depicted example, the network adapter 206 connects to the SB/ICH 202. The audio adapter 207, keyboard and mouse adapter 208, modem 209, read-only memory (ROM) 210, hard disk drive (HDD) 211, optical drive (CD or DVD) 212, universal serial bus (USB) ports and other communication ports 213, and the PCI/PCIe devices 214 can connect to the SB/ICH 702 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH.

An operating system can run on processing unit 203. The operating system can coordinate and provide control of various components within the data management computing system 14. As a client, the operating system can be a commercially available operating system. An object-oriented programming system, such as the Java programming system, may run in conjunction with the operating system and provide calls to the operating system from the object-oriented programs or applications executing on the data processing system 700. As a server, the data management computing system 14 can be an IBM® eServer™ System p® running the Advanced Interactive Executive operating system or the Linux operating system. The data management computing system 14 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the full question generation system can be performed by the processing unit 703 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. For example, the data management computing system 14 includes several components that would not be directly included in some embodiments illustrated in FIGS. 3-6. However, it should be understood that the embodiments illustrated in FIGS. 3-6 may include one or more of the components and configurations of the data management computing system 14 for performing processing methods and steps in accordance with the disclosed embodiments.

Moreover, other internal hardware or peripheral devices, such as flash memory, equivalent non-volatile memory, or optical disk drives may be used in addition to or in place of the hardware depicted. Moreover, the data management computing system 14 can take the form of any of a number of different data processing systems, including but not limited to, client computing devices, server computing devices, tablet computers, laptop computers, telephone or other communication devices, personal digital assistants, and the like. Essentially, data management computing system 14 can be any known or later developed data processing system without architectural limitation.

Referring back to FIG. 1, each of the one or more data servers 16(1)-16(n) may store and provide data to the data management computing system 14 via one or more of the communication networks 30, for example, although other types and/or numbers of storage media in other configurations could be used. In this particular example, each of the one or more data servers 16(1)-16(n) may comprise various combinations and types of storage hardware and/or software and represent a system with multiple network server devices in a data storage pool, which may include internal or external networks. Various network processing applications, such as CIFS applications, NFS applications, HTTP Web Network server device applications, and/or FTP applications, may be operating on the plurality of data servers 16(1)-16(n) and may transmit data in response to requests from the data management computing system 14. Each the one or more data servers 16(1)-16(n) may include a processor, a memory, and a communication interface, which are coupled together by a bus or other link, although each may have other types and/or numbers of other systems, devices, components, and/or other elements.

The non-transitory computer readable storage medium can be a tangible device that can retain and store instructions for use by an instruction execution device. The non-transitory computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A non-transitory computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The non-transitory computer readable program instructions described herein can be downloaded to respective computing/processing devices from a computer readable storage medium or to an external computer or external storage device via a communication network 30, for example, the Internet, a local area network (LAN), a wide area network (WAN) and/or a wireless network. The communication network 30 may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of communication network 30, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular features or elements present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the Figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112 (f), unless the element is expressly recited using the phrase "means for."

Figure 3:
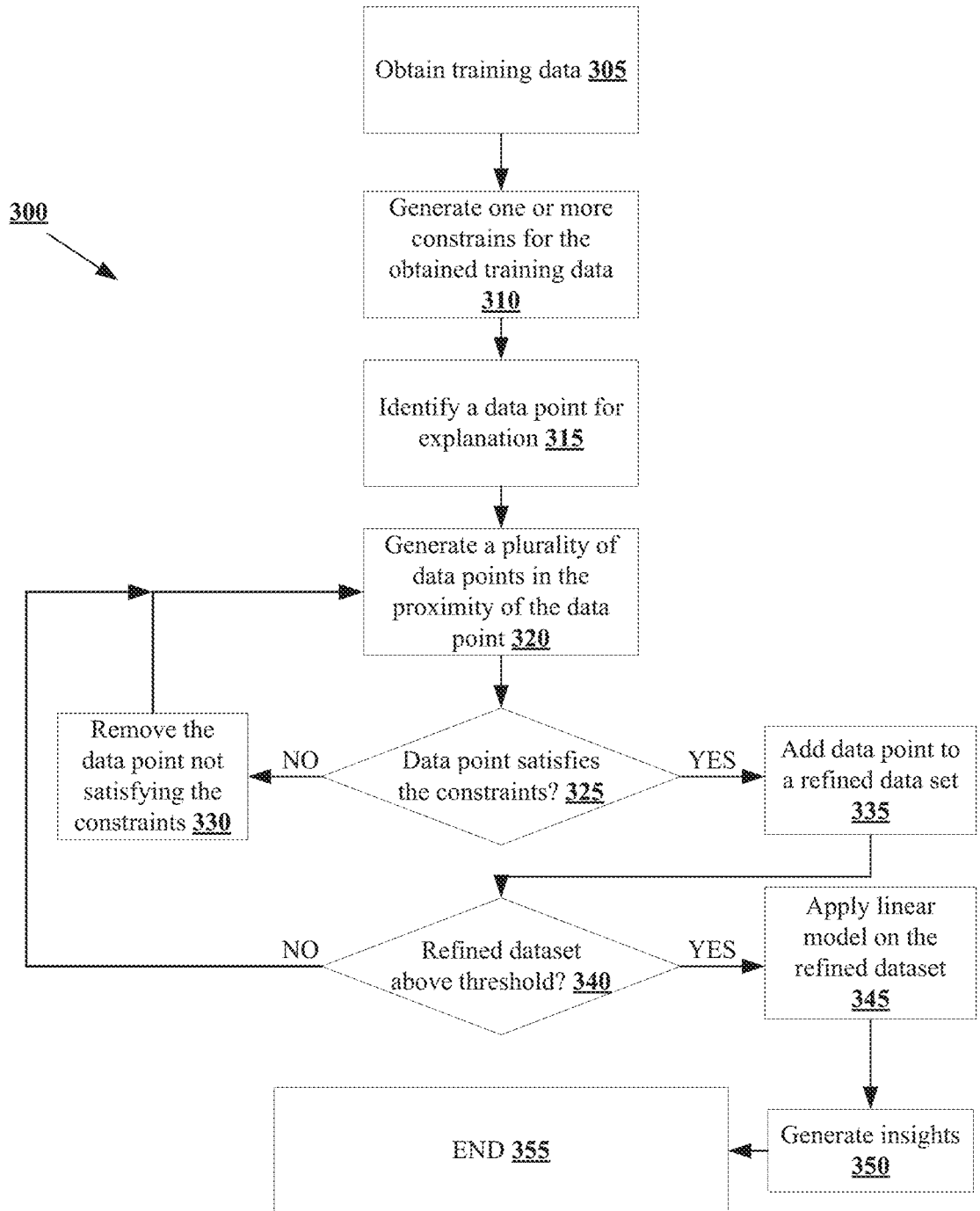
FIG. 3 is an exemplary flowchart illustrating a method 300 for refining dataset to accurately represent output of an artificial intelligence model.

An exemplary method for refining dataset to accurately represent output of an artificial intelligence model will now be illustrated with reference to FIG. 3. The exemplary method 300 begins at step 305 where the data management computing system 14 obtains training data from the plurality of data servers 16(1)-16(n). By way of example, the training data can include dataset that can be used to build a machine learning model, although training data can include other types or amounts of information.

Next in step 310, the data management computing system 14 generates one or more rules or constraints for the obtained training data as illustrated in FIG. 4. In this example, the constraints or rules can include category constraints, category-category constraints, and category-numerical constraints, although the constraints or the rules can include other types or amounts of information. By way of example, the numerical constraints includes the numerical range into which the obtained training data can be classified. In the category-category constraints defines the constraints associated with the combinations of different types of data that are present within the obtained training data. Finally, the category-numerical constraints in this example defines the numerical ranges that are present for each category of data within the obtained training data.

In step 315, the data management computing system 14 identifies a data point that requires identification of insights. In this example, the identification of the data point can be based on a request from a client device (not shown), although the data point can be identified based on other parameters.

In step 320, the data management computing system 14 generates a plurality of data points or a data set in the proximity of the identified data point that requires identification of insights. By way of example, the data management computing system 14 can generate about 10,000 different data points in the proximity of the identified data point, although the data management computing system 14 can generate other amounts of data points. In this example, the proximity to the identified data point can be defined by a distance between two data points using Euclidean distance for numerical values and Cosine distance for categorical values. Furthermore, in this example, the plurality of data points can be generated by applying the obtained training data on an artificial intelligence model that are built using frameworks such as scikit-learn, XGBoost, Keras, or Pytorch. By way of example, FIG. 5 illustrates an example of the plurality of data points or data set generated.

Next in step 325, the data management computing system 14 determines if each of generated data point satisfies all the generated constraints in step 310. By way of example, the data management computing system 14 determines if the generated data point satisfies the numerical constraint, the category-category constraint, and the category-numerical constraint, although the data management computing system 14 can determine if the data point satisfies at least one of the constraints in other examples. By way of example, row 505, row 510, row 515 and row 520 illustrates the data points that do not satisfy the generated constrains while the data points in the other rows satisfy the constraints. Accordingly, if the data management computing system 14 determines that the data point fails to satisfy the constraints, then the No branch is taken to step 330.

In step 330, the data management computing system 14 deletes the data point that fails to satisfy the constraints and the exemplary flow proceeds to step 320. However, back in step 325, if the data management computing system 14 determines that the data point satisfies the generated constraints, then the Yes branch is taken to step 335.

In step 335, the data management computing system 14 adds the data point that satisfies the constraints into a subset of data points and the exemplary flow proceeds to step 340.

In step 340, the data management computing system 14 determines if a number of data points in the subset of data points is equal to or exceeds a threshold number. In this example, the threshold number can be identified based on the type of artificial intelligence model that was used to generate the data points or a number of features values in the obtained training data, although the threshold number can be determined based on input from a client device (not shown) in other examples. By way of example, the threshold number of data points can be equal to 5000. Accordingly, if the data management computing system 14 determines that the data points in the subset is less than the threshold number, then the No branch is taken back to step 320 where additional data points are generated. However, if the data management computing system 14 determines that the number of data points in the subset is equal to or exceeds the threshold number, then the Yes branch is taken to step 345.

In step 345, the data management computing system 14 applies a linear model to the subset of data points. In this example, the subset of data points is a dataset of the data points that is generated or refined from the data points generated in step 320. By applying a linear model to the subset of the data points, the data management computing system 14 is able to identify all the data points that satisfies the constraints and is within the proximity of the identified data point.

Figure 6:
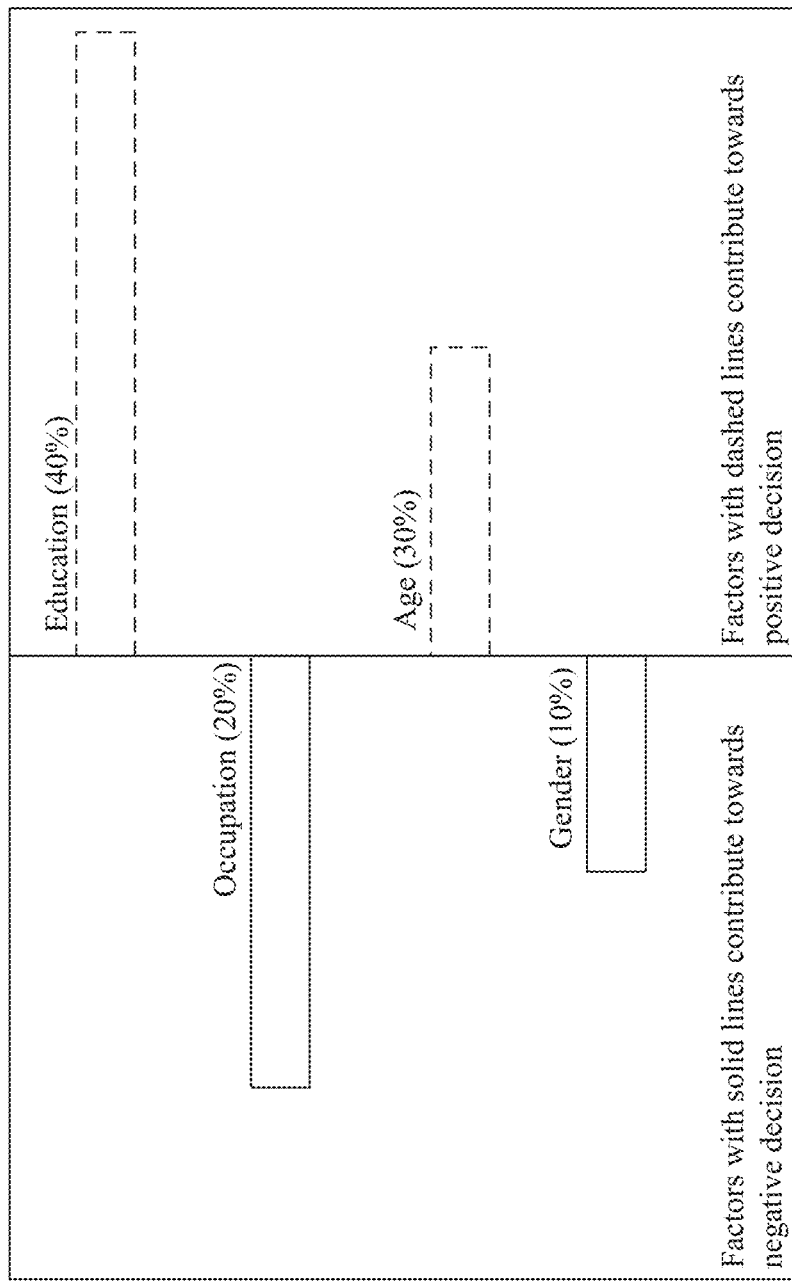
FIG. 6 is an exemplary image illustrating insights that are generated.

In step 350, the data management computing system 14 generates insights based on the application of the linear model on the subset of the data points. In this example, the insights can include the explanations for arriving at the identified data point, although the insights can include other types or amounts of information. By way of example, the insights can be displayed on a graphical user interface that is specifically generated to display the insights, although other techniques can be used to generate and provide the insights. The exemplary method ends at step 355. By way of example, FIG. 6 provides an example of the insights that can be generated by the data management computing system 14. As illustrated in FIG. 6, factors such as gender and occupation contributed to the negative decision and education along with age contributed to a positive decision.

Now an example illustrating the steps 305-355 will be described. Consider a machine learning model that predicts whether an applicant should be given a loan or not. The input feature values could be different attributes of the applicant like age of the applicant, salary, current city, credit score, job etc. First, the data management computing system 14 learns the various constraints present in the training data used to build this machine learning model. Next, the data management computing system 14 generates constraints such as age group between 20-40 and then 60-80, location, and the type of current job. Next, when an application for a loan is received through a client device, the machine learning model gathers all the attributes/feature inputs from the application and provides an answer Loan-Granted/Not-Granted, which is an identified data point. To provides insights for the decision, the data management computing system 14 generate 10,000 data points around the local neighborhood of this applicant's features. Next, the data management computing system 14 identifies the data points that satisfies the constraints that was generated. The data points not satisfying the constraints are deleted and the data point satisfying the constraints are added to a subset of data points. Next, data management computing system 14 determines if the number of data points in the subset exceeds a threshold number (5000 for example) and once it exceeds the threshold, the data management computing system 14 applies the linear model. Based on the linear model, the data management computing system 14 provides insights regarding how various features within the application influenced the final decision.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A method comprising:
   obtaining, by a computing system, a dataset used to interpret a binary decision of an artificial intelligence model, the dataset being used to make the binary decision;
   generating, by the computing system, one or more constraints for the obtained dataset;
   identifying, by the computing system, a first data point for identification of one or more insights thereabout;
   generating, by the computing system, a plurality of data points from the dataset that are in proximity to the first data point;
   identifying, by the computing system, a subset of data points from the generated plurality of data points satisfying the one or more constraints;
   applying, by the computing system, a linear model on the identified subset of data points satisfying the one or more constraints; and
   generating, by the computing system and based on the linear model, the one or more insights illustrating the binary decision of the artificial intelligence model.

2. The method as set forth in claim 1, wherein the dataset comprises training data to train the artificial intelligence model.

3. The method as set forth in claim 2 further comprising, generating, by the computing system, the one or more constraints from the generated training data to train the artificial intelligence model.

4. The method as set forth in claim 1 wherein a number of data points in the identified subset of data points exceeds a threshold number.

5. The method as set forth in claim 1 further comprising, deleting, by the computing system, another subset of data points from the plurality of data points not satisfying the one or more constraints.

6. The method as set forth in claim 1 wherein the one or more constraints further comprises, a category constraint, a category-category constraint, and a category-numerical constraint.

7. A non-transitory machine readable medium having stored thereon instructions comprising machine executable code which when executed by at least one machine causes the machine to:
   obtain a dataset used to interpret a binary decision of an artificial intelligence model, the dataset being used to make the binary decision;
   generating, by the computing system, one or more constraints for the obtained dataset;
   identifying, by the computing system, a first data point for identification of one or more insights thereabout;
   generating, by the computing system, a plurality of data points from the dataset that are in proximity to the first data point;
   identify a subset of data points from the generated plurality of data points satisfying the one or more constraints;
   apply a linear model on the identified subset of data points satisfying the one or more constraints; and
   generate, based on the linear model, the one or more insights illustrating the binary decision of the artificial intelligence model.

8. The medium as set forth in claim 7, wherein the dataset comprises training data to train the artificial intelligence model.

9. The medium as set forth in claim 8 further comprising, generating the one or more constraints from the generated training data to train the artificial intelligence model.

10. The medium as set forth in claim 7 wherein a number of data points in the identified subset of data points exceeds a threshold number.

11. The medium as set forth in claim 7 further comprising, deleting another subset of data points from the plurality of data points not satisfying the one or more constraints.

12. The medium as set forth in claim 7 wherein the one or more constraints further comprises, a category constraint, a category-category constraint, and a category-numerical constraint.

13. A data management computing system, comprising a memory comprising programmed instructions stored in the memory and one or more processors configured to be capable of executing the programmed instructions stored in the memory to:
   obtain a dataset used to interpret a binary decision of an artificial intelligence model, the dataset being used to make the binary decision;
   generate, by the computing system, one or more constraints for the obtained dataset;
   identify, by the computing system, a first data point for identification of one or more insights thereabout;
   generate, by the computing system, a plurality of data points from the dataset that are in proximity to the first data point;
   identify a subset of data points from the generated plurality of data points satisfying the one or more constraints;
   apply a linear model on the identified subset of data points satisfying the one or more constraints; and
   generate, based on the linear model, the one or more insights illustrating the binary decision of the artificial intelligence model.

14. The system as set forth in claim 13 wherein the dataset comprises training data to train the artificial intelligence model.

15. The system as set forth in claim 14 wherein the one or more processors are further configured to be capable of executing the programmed instructions stored in the memory to generate the one or more constraints from the generated training data to train the artificial intelligence model.

16. The system as set forth in claim 13 wherein a number of data points in the identified subset of data points exceeds a threshold number.

17. The system as set forth in claim 13 wherein the one or more processors are further configured to be capable of executing the programmed instructions stored in the memory to delete another subset of data points from the plurality of data points not satisfying the one or more constraints.

18. The system as set forth in claim 13 wherein the one or more constraints further comprises, a category constraint, a category-category constraint, and a category-numerical constraint.

* * * * *